(12) United States Patent
Matsuda et al.

(10) Patent No.: US 11,262,284 B2
(45) Date of Patent: Mar. 1, 2022

(54) PARTICLE COUNTER

(71) Applicant: RION Co., Ltd., Tokyo (JP)

(72) Inventors: Tomonobu Matsuda, Tokyo (JP); Takashi Minakami, Tokyo (JP); Daisuke Sakaue, Tokyo (JP); Daisuke Shinozaki, Tokyo (JP)

(73) Assignee: RION Co., Ltd., Tokyo (JP)

( * ) Notice: Subject to any disclaimer, the term of this patent is extended or adjusted under 35 U.S.C. 154(b) by 11 days.

(21) Appl. No.: 16/747,286

(22) Filed: Jan. 20, 2020

(65) Prior Publication Data

US 2020/0240890 A1 Jul. 30, 2020

(30) Foreign Application Priority Data

Jan. 24, 2019 (JP) .............................. JP2019-009879

(51) Int. Cl.
*G01N 15/02* (2006.01)
*G01N 21/53* (2006.01)
*G01N 15/14* (2006.01)

(52) U.S. Cl.
CPC ......... *G01N 15/0205* (2013.01); *G01N 21/53* (2013.01); *G01N 2015/1486* (2013.01); *G01N 2015/1493* (2013.01)

(58) Field of Classification Search
CPC ............... G01N 15/1459; G01N 21/53; G01N 15/0205; G01N 2015/1452; G01N 2015/1493; G01N 2015/1006; G01N 2015/1486; G01N 21/0303; G01N 21/05; G01N 2021/0357

See application file for complete search history.

(56) References Cited

U.S. PATENT DOCUMENTS

| 4,784,486 A * | 11/1988 | Van Wagenen ....... G01J 3/4412 356/301 |
| 5,011,286 A * | 4/1991 | Petralli ............. G01N 15/0205 356/338 |
| 5,427,920 A * | 6/1995 | Berndt ................. G01N 21/253 356/339 |
| 6,618,144 B1 * | 9/2003 | Reed ................. G01N 15/0211 356/336 |
| 2008/0174768 A1 * | 7/2008 | Belz ..................... C07D 487/04 356/73 |
| 2009/0101847 A1 | 4/2009 | Furuki et al. |

(Continued)

FOREIGN PATENT DOCUMENTS

| EP | 2051061 A2 | 4/2009 |
| JP | 2002-243632 A | 8/2002 |

*Primary Examiner* — Sang H Nguyen
(74) *Attorney, Agent, or Firm* — Rankin, Hill & Clark LLP

(57) ABSTRACT

A particle counter includes: a multi-flow cell with flow passages arrayed in a first direction and having a section including a detection region, for detecting a particle, formed when the flow passage is irradiated with irradiation light; a light receiving optical system configured to receive emitted light generated from a particle contained in sample fluid flowing in the at least one flow passage and passing through the detection region; an optical axis moving unit configured to move an optical axis of the irradiation light and an optical axis of the emitted light in the first direction; and a counter configured to count the particle for each particle size based on an intensity of the emitted light.

10 Claims, 11 Drawing Sheets

(56) References Cited

U.S. PATENT DOCUMENTS

2009/0195784 A1* 8/2009 Ogura .................... G01N 21/05
　　　　　　　　　　　　　　　　　　　　　　356/445
2011/0249254 A1* 10/2011 Ruggiero ............... G01N 21/51
　　　　　　　　　　　　　　　　　　　　　　356/51
2016/0358829 A1* 12/2016 Hayashi ................. G01N 21/85

* cited by examiner

PARTICLE COUNTER

CROSS-REFERENCE TO RELATED APPLICATION

This application claims priority from Japanese Patent Application No. 2019-009879 filed with the Japan Patent Office on Jan. 24, 2019, the entire content of which is hereby incorporated by reference.

BACKGROUND

1. Technical Field

One aspect of the present disclosure relates to a particle counter.

2. Related Art

Typically, a measuring device (a particle counter) including multiple flow cells for continuously measuring multiple types of sample liquid has been known (see, e.g., JP-A-2002-243632). In this measuring device, an irradiation optical system and a light receiving optical system are fixed at predetermined positions. Meanwhile, the multiple flow cells arrayed in the horizontal direction are provided movably as a whole. Positioning is performed in such a manner that all of the multiple flow cells are moved in the horizontal direction such that the flow cell targeted for measurement is arranged on an optical path of the irradiation optical system. Thereafter, measurement of the sample liquid is performed. Moreover, sample liquid inlet and outlet ports are provided on upper and lower sides of each flow cell. The sample liquid flows in the flow cell through a lower portion thereof, and is discharged from the flow cell through an upper portion thereof.

SUMMARY

A particle counter includes: a light source configured to emit irradiation light; an irradiation optical system configured to irradiate a predetermined position on an optical axis with the irradiation light; a multi-flow cell comprising transparent bodies at fixed positions on a main body and including flow passages arrayed in a first direction, the flow passage having a detection region for detecting a particle contained in a sample fluid flowing in the flow passage, the detection region being formed at the predetermined position on the optical axis in the flow passage when the predetermined position is irradiated with the irradiation light from outside; a light receiving optical system configured to receive emitted light generated from the particle passing through the detection region, the light receiving optical system taking a second direction perpendicular to the first direction as an optical axis; an optical axis moving unit configured to move, along the array of the multiple flow passages, an optical axis of the irradiation light entering the at least one flow passage and an optical axis of the emitted light received by the light receiving optical system in the first direction; and a counter configured to count the particle for each particle size based on an intensity of the emitted light received by the light receiving optical system.

DETAILED DESCRIPTION

Figure 1:
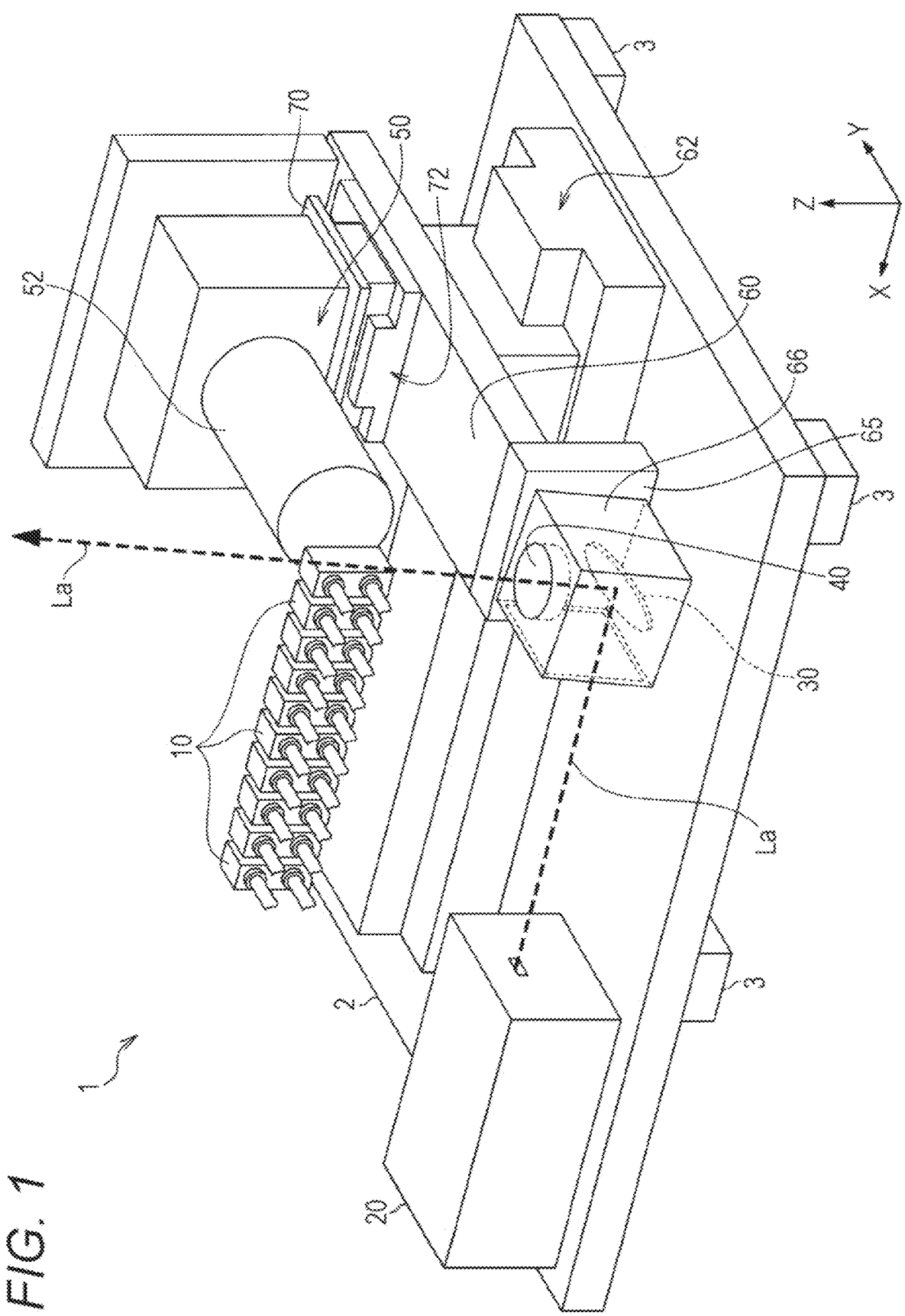
FIG. 1 is a schematic perspective view of a particle counter in one embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the related art of JP-A-2002-243632, pipes connected to the flow cells are also moved in association with movement of the flow cells. For this reason, as measurement proceeds, looseness of a connection portion between the pipe and the flow cell or cracking at a bent portion of the pipe due to load accumulation is easily caused, and due to such looseness or cracking, there are possibilities that leakage of the sample liquid is caused. Moreover, a structure in which the sample liquid flows from the lower side to the upper side is employed, and for this reason, a pipe for inflow of the sample liquid and a pipe for outflow of the sample liquid are each connected to the lower and upper portions of each flow cell. Thus, many spaces are necessary for such pipe arrangement. Because of these reasons, it is difficult to avoid upsizing of the device.

For these reasons, one object of the present disclosure is to provide the technique of preventing leakage of sample fluid in a particle counter and the technique of downsizing such a particle counter.

One aspect of the present disclosure provides the following particle counter. Note that phrasing in parentheses below is merely made by way of example, and the aspect of the present disclosure is not limited to such phrasing.

That is, the particle counter (the present particle counter) according to one aspect of the present disclosure includes a light source configured to emit irradiation light, an irradiation optical system configured to irradiate a predetermined position on an optical axis with the irradiation light, a multi-flow cell including flow passages arrayed in a certain direction and having a particle detection region formed at the predetermined position in the flow passage when the predetermined position is irradiated with the irradiation light, a light receiving optical system configured to receive emitted light generated from a particle passing through the detection region, an optical axis moving unit configured to move, along the array of the multiple flow passages, the optical axis of the irradiation light entering the flow passage and the optical axis of the emitted light received by the light receiving optical system, and a counter configured to count the particle for each particle size based on the intensity of the emitted light received by the light receiving optical system.

The present particle counter counts, for example, the particle contained in the sample fluid flowing in the flow passage placed in a main body by means of the irradiation light with which the inside of the flow passage is irradiated.

The multi-flow cell comprises transparent bodies at fixed positions on the main body and includes the flow passages inside. The positions of the multiple flow passages arrayed in the multi-flow cell with respect to the main body are constant. Moreover, in the multi-flow cell, the array of the multiple flow passages is formed such that multiple sections where the particle detection region is formed are arrayed in a first direction (e.g., a width direction of the present particle counter). The light receiving optical system receives the emitted light generated from the particle, the light receiving optical system taking a second direction (e.g., a depth direction of the counter) perpendicular to the first direction as an optical axis. Moreover, the optical axis moving unit moves the optical axis of the irradiation light entering the flow passage and the optical axis of the emitted light received by the light receiving optical system in the first direction.

In the present particle counter of this aspect, the flow passage (the flow passage as an irradiation light condensing destination) in which the detection region is formed is switched among the multiple flow passages in the multi-flow cell, and in this manner, other detection can be performed. Upon switching of the flow passage, the optical axis of the irradiation light entering the flow passage and the optical axis of the emitted light received by the light receiving optical system move in the first direction. On the other hand, the multi-flow cell does not move. Thus, in the present particle counter of this aspect, pipes connected to the multi-flow cell do not move. For this reason, e.g., looseness and cracking due to pipe movement are less caused. As a result, leakage of the sample fluid can be reduced.

Preferably, the present particle counter further includes a focal point adjustment unit configured to adjust the focal point of the light receiving optical system in the second direction.

In the present particle counter of this aspect, the focal point of the light receiving optical system is adjusted in the second direction in association with switching of the flow passage in which the detection region is formed. Moreover, the position of the focal point moves in the second direction. However, the multi-flow cell does not move after all. Thus, in the present particle counter of this aspect, the pipes connected to the multi-flow cell do not move either. Consequently, leakage of the sample fluid which may be caused due to pipe movement can be reduced.

More preferably, in the present particle counter, the focal point adjustment unit includes an actuator configured to move a stage configured to support the light receiving optical system in the second direction to adjust the focal point in the second direction. Moreover, the optical axis moving unit includes another actuator configured to move a stage configured to support the actuator together with the irradiation optical system in the first direction to move each optical axis in the first direction.

In the present particle counter of this aspect, each of the focal point adjustment unit and the optical axis moving unit has the actuator. The focal point adjustment unit uses the actuator included in this unit itself to move the light receiving optical system in the second direction. On the other hand, the optical axis moving unit uses the actuator included in this unit itself to collectively move the irradiation optical system and the actuator included in the focal point adjustment unit in the first direction. Thus, in the present particle counter of this aspect, movement of each configuration (the irradiation optical system, the light receiving optical system) relating to adjustable elements (the optical axis of the irradiation light entering the flow passage, the optical axis of the emitted light received by the light receiving optical system, the focal point of the light receiving optical system) in the same direction can be collectively performed. With this configuration, each configuration does not need to be separately moved in the first or second direction. Thus, movement of the optical axes and adjustment of the focal point in association with switching of the flow passage can be efficiently performed.

Much more preferably, the present particle counter further includes a storage configured to store, regarding the multiple flow passages formed inside the multi-flow cell, at least a position in the first direction in advance, the position in the first direction being the position of each optical axis moved corresponding to the position of each flow passage by the optical axis moving unit. The optical axis moving unit is configured to move, corresponding to the flow passage in which the detection region is formed, each optical axis to the position of each optical axis stored in advance in the storage.

Moreover, in the present particle counter of this aspect, in addition to the position of each optical axis, the storage stores, in advance, the position of the focal point in the second direction, the focal point being adjusted corresponding to the position of each flow passage by the focal point adjustment unit. The focal point adjustment unit is configured to adjust, corresponding to the flow passage in which the detection region is formed, the focal point to the position of the focal point stored in advance in the storage.

In the present particle counter of this aspect, the position (e.g., coordinates in the width direction, X-coordinates) of each optical axis in the first direction and the position (e.g., coordinates in the depth direction, Y-coordinates) of the focal point in the second direction are precisely adjusted corresponding to the position of each flow passage at the stage of manufacturing. The positions (the X-coordinates and the Y-coordinates corresponding to each flow passage) in two directions are stored in advance in the storage, these positions being determined based on an adjustment result and corresponding to each flow passage.

Thus, the present particle counter of this aspect automatically moves, in association with switching of the flow passage, each optical axis and the focal point by a distance corresponding to the positions stored corresponding to the flow passage in advance, and in this manner, the optical axis of the irradiation light entering the flow passage, the optical axis of the emitted light received by the light receiving optical system, and the focal point of the light receiving optical system can be moved to positions optimal for the flow passage. With this configuration, particle detection and particle counting can be performed with high accuracy.

Moreover, in the present particle counter, the multi-flow cell is preferably configured such that multiple flow cells of the transparent bodies having the flow passages are arrayed, and each flow cell is preferably fixed in close contact with a portion as a reference of the position of the entirety of the multi-flow cell in the first and second directions.

According to the present particle counter of this aspect, each flow cell is firmly fixed at an intended correct position in the multi-flow cell. Thus, degradation of the accuracy of particle detection and particle counting due to shift of the position of each flow cell can be reduced in advance.

Much more preferably, in the present particle counter, each flow cell is in a substantially rectangular solid shape, and includes an inlet port into which the sample fluid is supplied and an outlet port from which the sample fluid is discharged at the same side surface. Moreover, each flow cell includes a flow passage formed as one passage and having a first flow passage extending in the second direction from the inlet port, a third flow passage extending in the second direction from the outlet port, and a second flow passage extending in a third direction perpendicular to any of the first and second directions and connected to the first and third flow passages.

In a case where multiple flow cells (e.g., flow cells having substantially-straight flow passages) each configured such that sample fluid inlet and outlet ports are formed at different surfaces are arrayed to form a multi-flow cell, a pipe space is ensured corresponding to each surface. For this reason, upsizing of a particle counter is not avoidable. On the other hand, in the present particle counter of the above-described aspect, the sample fluid inlet and outlet ports are formed at the same surface of the flow cell. Thus, in the multi-flow cell, pipes connected to the flow cells included in the multi-flow cell are arrayed at the same surface of the multi-flow cell. Consequently, according to the present particle counter of this aspect, a space ensured for the pipes is only at one surface. As a result, the present particle counter can be downsized.

In a case where the multiple flow cells each configured such that the sample fluid inlet and outlet ports are formed at the different surfaces are arrayed to form the multi-flow cell, pipes are connected to different surfaces. For this reason, there are, depending on the direction of pipe extension, possibilities that the pipe interferes irradiation light exiting from the flow cell, or there are possibilities that the pipe warps due to contact with other components and a fine particle is caused from, e.g., an inner wall of the pipe. This may be a noise source, leading to degradation of detection accuracy. On the other hand, according to the present particle counter of the above-described aspect, interference of the pipe with the irradiation light or contact of other components is less caused. Thus, occurrence of noise due to the pipe can be reduced. As a result, particle detection and particle counting can be performed with favorable accuracy.

More preferably, in the present particle counter, the emitted light is scattered light or fluorescence. According to the present particle counter of this aspect, one of the scattered light or the fluorescence easily receivable depending on the properties of the particle contained in the sample fluid can be selected as a receiving target. Thus, the accuracy of particle detection and particle counting can be improved.

As described above, according to the present particle counter, leakage of the sample fluid can be reduced, and the particle counter can be downsized.

Hereinafter, embodiments of the present disclosure will be described with reference to the attached drawings. Note that the embodiments below are preferable examples, and the technique of the present disclosure is not limited to these examples.

[Configuration of Particle Counter]

FIG. 1 is a schematic perspective view of a particle counter 1 in one embodiment. For the sake of easy understanding of the embodiment, some components are not shown in FIG. 1. Note that the particle counter 1 is one aspect of a particle counter.

The particle counter 1 includes, for example, a light source 20, a mirror 30, a lighting lens 40, multiple flow cells 10, and a light receiving unit 50. Each component of the particle counter 1 is directly or indirectly supported on a sensor base 2 with, e.g., a not-shown jig. Multiple leg portions 3 are provided on a bottom surface of the sensor base 2. The leg portion 3 is formed from an elastic member which can absorb vibration, such as antivibration rubber. With this configuration, transmission of vibration caused around to each component is reduced. Moreover, the particle counter 1 is housed in a not-shown housing. Thus, the sensor base 2, the not-shown housing, and the like structurally form a main body portion (a counter main body, a main body) in the particle counter 1.

In an installation state or a use state of the particle counter 1, in a case where a longitudinal direction of the sensor base 2 is a width direction of the counter main body and a direction perpendicular to such a direction is a front-back (depth) direction, the multiple flow cells 10 are arrayed in the width direction. Each flow cell 10 has, on a front side thereof, an inlet and an outlet of sample fluid. Pipes are each connected to the inlet and the outlet. Each flow cell 10 is fixed to the inside of a flow cell holder 6 (see FIG. 6) not shown in FIG. 1. These multiple flow cells 10 are integrally included in a flow cell unit (a multi-flow cell) 80 (see FIGS. 2A and 2B). The flow cell holder 6 (see FIG. 6) is set to a flow cell base 5 (see FIGS. 2A and 2B), and is indirectly supported by the sensor base 2.

Note that in the present embodiment, ten flow cells 10 are arrayed in the width direction. Note that the number of flow cells 10 is not limited to above. An internal structure of the flow cell unit will be described later in detail with reference to another drawing. Moreover, in subsequent description, a direction (the width direction of the counter main body) in which the multiple flow cells 10 are arrayed as a first direction will be referred to as an "X-direction," and an axis extending in the X-direction will be referred to as an "X-axis."

The light source 20 is fixed to the sensor base 2. The light source 20 emits irradiation light La (e.g., laser light) having a predetermined wavelength in the X-direction at a spread angle which can be taken as parallel. The sensor base 2 also serves as a heat sink of the light source 20, and efficiently releases heat generated from the light source 20. The mirror 30 reflects the irradiation light La emitted from the light source 20 toward a detection region in the flow cell 10. Moreover, the lighting lens 40 is provided on an optical path of the irradiation light La reflected on the mirror 30. The irradiation light La passes through the lighting lens 40. The irradiation light La can be condensed (concentrated) by the lighting lens 40. With this configuration, the irradiation light La having a high energy density can be condensed to the detection region of the flow cell 10.

The light receiving unit 50 is provided behind the flow cells 10. The light receiving unit 50 includes, for example, multiple light receiving lenses, a light receiving element, an amplifier, and an A/D converter. The multiple light receiving lenses are housed in a cylindrical light receiving tube 52 for reducing reception of light of background noise. At the flow cell 10 that the irradiation light La enters, when a particle contained in the sample fluid passes through the detection region, scattered light (one example of emitted light) is generated from the particle. Such scattered light is condensed by the multiple light receiving lenses. Then, such light is received by the light receiving element (e.g., a photodiode), and is converted into an electrical signal. This electrical signal is eventually converted into an output signal having a level corresponding to the intensity of the scattered light. This output signal is sent to a control unit 90 (see FIG. 10). Based on the intensity of the scattered light indicated by the output signal, particle counting is performed for each particle size. In a case where the particle contains a fluorescent substance, fluorescence (one example of the emitted light) is generated from the particle depending on the setting of the wavelength of the irradiation light. An optical filter for selecting the wavelength is added to the light receiving lenses in order that the fluorescence emitted from the particle can be received and counting can be performed as in the case of the scattered light.

Note that a configuration of the control unit 90 will be described later with reference to another drawing. Moreover, in subsequent description, the center axis (hereinafter referred to as a "light receiving axis") of the light receiving lens will be referred to as a "Y-axis," and a direction in which the Y-axis extends (the front-back direction of the counter main body) as a second direction will be referred to as a "Y-direction." In a case where the vertical direction is a "Z-direction," the X-direction, the Y-direction, and the Z-direction cross orthogonally with each other.

The particle counter 1 includes an X-axis stage 60 for moving some components in the X-direction and a Y-axis stage 70 for moving some components in the Y-direction. Of these components, the X-axis stage 60 is provided on a slider of an X-axis actuator 62 extending in the X-direction. The Y-axis stage 70 is provided on a slider of a Y-axis actuator 72 extending in the Y-direction. Moreover, the slider of the Y-axis actuator 72 is provided on the X-axis stage 60.

The X-axis actuator 62 and the Y-axis actuator 72 are linear actuators, for example. The X-axis actuator 62 and the Y-axis actuator 72 slide, using built-in motors as drive sources, the stages provided on the sliders thereof along linear guides.

The X-axis actuator 62 is fixed to the sensor base 2, and using the X-axis motor as the drive source, slides the X-axis stage 60 in the X-direction.

The Y-axis actuator 72 is fixed to the X-axis stage 60, and using the Y-axis motor as the drive source, slides the Y-axis stage 70 in the Y-direction. When the X-axis stage 60 slides in the X-direction, all components supported on the X-axis stage 60 move in the X-direction accordingly. Moreover, when the Y-axis stage 70 slides in the Y-direction, all components supported on the Y-axis stage 70 move in the Y-direction accordingly. Note that such movement is performed in a state in which the counter main body including the sensor base 2 is fixed.

Of the above-described components of the particle counter 1, the mirror 30 and the lighting lens 40 are fixed to a front end of the X-axis stage 60 through a vertical bracket 65 and a holder 66. The Y-axis stage 70 is indirectly supported on the X-axis stage 60 through the slider of the Y-axis actuator 72. Moreover, the light receiving unit 50 is fixed to the Y-axis stage 70. Thus, in association with slide of the X-axis stage 60, the mirror 30, the lighting lens 40, and the light receiving unit 50 move in the X-direction. In association with slide of the Y-axis stage 70, the light receiving unit 50 moves in the Y-direction.

Note that the X-axis motor and the Y-axis motor as the drive sources of the X-axis actuator 62 and the Y-axis actuator 72 are not necessarily built in the X-axis actuator 62 or the Y-axis actuator 72, and may be provided outside the X-axis actuator 62 and the Y-axis actuator 72. In this case, the Y-axis motor is not necessarily supported on the X-axis stage 60.

Subsequently, the form of movement in the X-direction and the Y-direction will be specifically described with reference to FIGS. 2A and 2B.

Figure 2A:
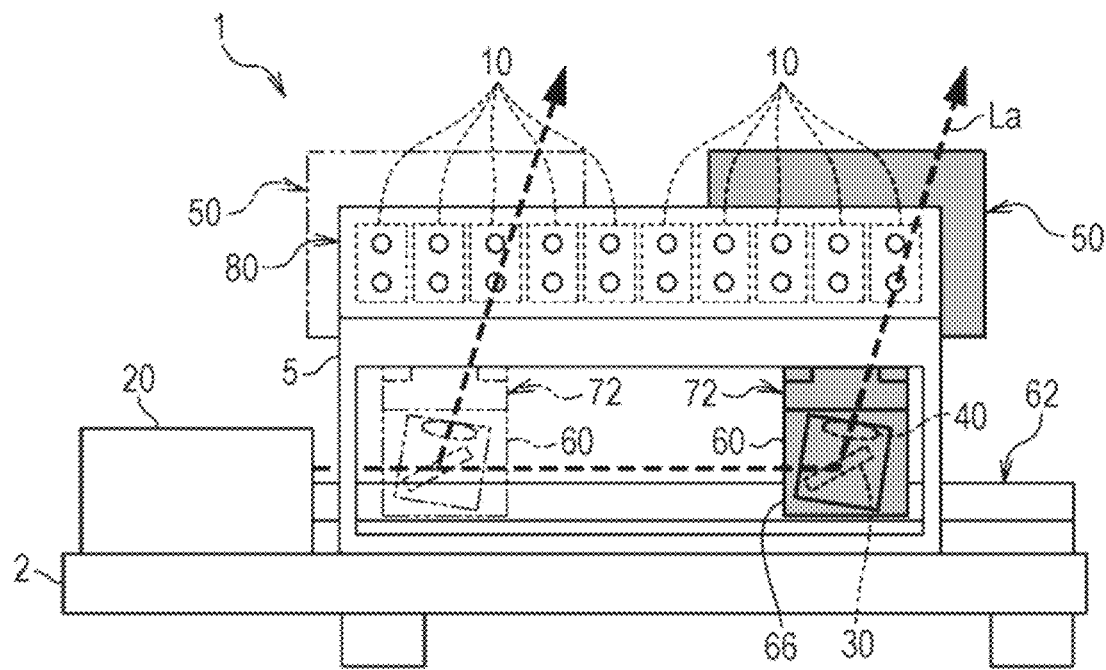
FIG. 2A is a front view of the particle counter in one embodiment.

FIG. 2A is a front view of the particle counter 1 in one embodiment. The flow cell unit 80 includes the multiple flow cells 10. In the flow cell unit 80, the multiple flow cells 10 are integrally housed in the flow cell holder 6 (see FIG. 6). The flow cell unit 80 is fixed to the sensor base 2 through the flow cell base 5. In an illustrated state, the irradiation light La emitted from the light source 20 is reflected on the mirror 30, passes through the lighting lens 40, and is concentrated to enter the detection region of the first flow cell 10 from the right side as viewed from the front side.

The mirror 30 and the lighting lens 40 are fixed to optimal positions for concentrating the irradiation light La to the light receiving axis of the light receiving unit 50 positioned behind the flow cells 10 and adjusting the center of detection region to the light receiving axis. Moreover, the position (hereinafter referred to as "X-coordinates") of the X-axis stage 60 corresponding to the X-direction position of the light receiving axis (the light receiving unit 50) corresponding to each flow cell 10 is determined based on an adjustment result at the stage of manufacturing, and is stored in advance in the control unit 90.

When a channel targeted for counting is selected by the control unit 90, the X-axis motor built in the X-axis actuator 62 is driven, and the X-axis stage 60 slides to the X-coordinates corresponding to the flow cell 10 of the channel targeted for counting. Then, in association with slide of the X-axis stage 60, the mirror 30, the lighting lens 40, and the light receiving unit 50 indirectly supported on the X-axis stage 60 move in the X-direction. Note that gray portions in the figure indicate the components movable in the X-direction. Moreover, a chain double-dashed line in the figure indicates the position of the component in a case where the X-axis stage 60 slides to the X-coordinates corresponding to the third flow cell 10 from the left side as viewed from the front side.

Figure 2B:
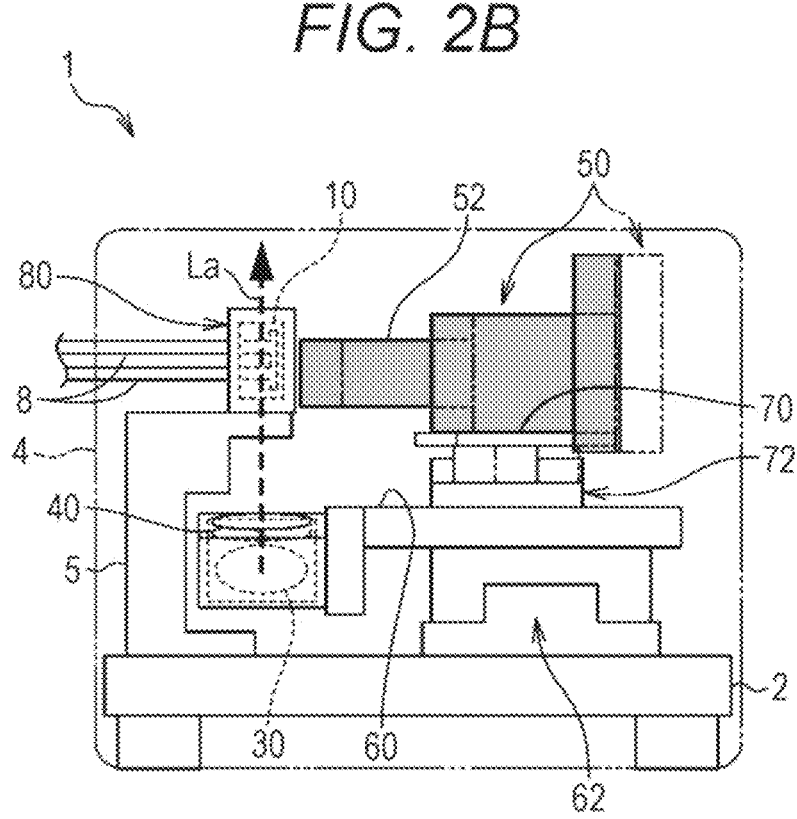
FIG. 2B is a side view of the particle counter.

FIG. 2B is a side view of the particle counter 1 in one embodiment. Pipes 8 connected to the flow cells 10 extend from the flow cell unit 80 fixed to the sensor base 2 through the flow cell base 5 to the outside of the housing 4 through a pipe window provided on the front side of the housing 4. In an illustrated state, the light receiving tube 52 (the light receiving unit 50) is present at a position indicated by a solid line. Thus, a distance between the light receiving tube 52 and the flow cell unit 80 in the Y-direction is constant. However, due to a micron-order (μm) processing error at the stage of manufacturing, there is a slight individual difference in the size of each flow cell 10. For this reason, a distance between the light receiving tube 52 and the detection region of each flow cell 10 in the Y-direction is not constant.

For this reason, the light receiving unit 50 is preferably moved to a Y-direction position corresponding to each flow cell 10 to correct the distance between the light receiving tube 52 and the detection region of each flow cell 10 in the Y-direction, thereby adjusting the focal point positions of the multiple light receiving lenses housed in the light receiving tube 52 with high accuracy. By such adjustment, the scattered light generated from a nano-order (nm) fine particle can be precisely condensed to the light receiving element. The position (hereinafter referred to as "Y-coordinates") of the Y-axis stage 70 corresponding to the Y-direction position of the light receiving unit 50 corresponding to each flow cell 10 is also determined based on the adjustment result at the stage of manufacturing, and is stored in advance in the control unit 90.

When the channel targeted for counting is specified by the control unit 90, the X-axis stage 60 first slides to the X-coordinates corresponding to the flow cell 10 of the channel targeted for counting as described above. Accordingly, the mirror 30, the lighting lens 40, and the light receiving unit 50 move in the X-direction. Thereafter, the Y-axis motor built in the Y-axis actuator 72 is driven, and the Y-axis stage 70 next slides to the Y-coordinates corresponding to the flow cell 10 of the channel targeted for counting. Accordingly, the light receiving unit 50 moves in the Y-direction. Note that gray portions in the figure indicate the components movable in the Y-direction. Moreover, a chain double-dashed line in the figure indicates the position of the component in a case where the Y-axis stage 70 slides to the back side with respect to a position indicated by a solid line.

As described above, a user of the particle counter 1 merely selects the channel targeted for counting in order that the X-axis stage 60 and the Y-axis stage 70 can be slid to the coordinates corresponding to the flow cell 10 of such a channel, i.e., the mirror 30, the lighting lens 40, and the light receiving unit 50 can be moved to optimal positions. In this manner, the positions of the optical axes of the irradiation optical system and the positions of the optical axis and focal point of the light receiving optical system can be adjusted with high accuracy according to the selected channel.

[Structure of Flow Cell]

Figure 3:
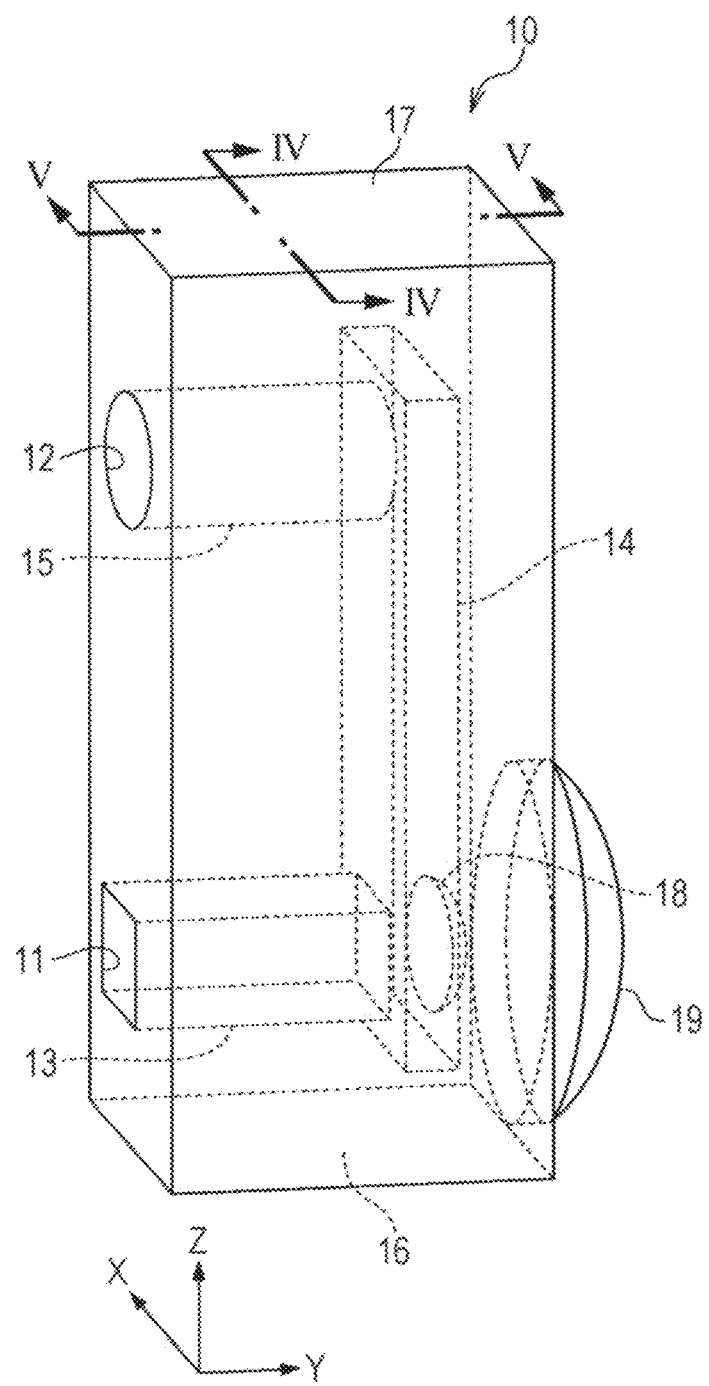
FIG. 3 is a perspective view of a flow cell in one embodiment.

FIG. 3 is a perspective view of the flow cell 10 in one embodiment from the lateral side.

The flow cell 10 is formed in a substantially rectangular solid shape with using a transparent material such as quartz or sapphire, and has a substantially C-shaped flow passage. Specifically, the flow cell 10 has a first flow passage 13, a second flow passage 14, and a third flow passage 15. The first flow passage 13 extends in the Y-direction from an inlet port 11 formed at a lower front portion. The third flow passage 15 extends in the Y-direction (the second direction) from an outlet port 12 formed at an upper front portion. The second flow passage 14 is connected to (i.e., "communicates with") each end portion of the first flow passage 13 and the third flow passage 15, and extends in the Z-direction (a third direction) and forms one passage. Moreover, a recessed portion 18 formed in a recessed shape is provided at a back portion of the second flow passage 14 at a position on an extension of the first flow passage 13. Further, a condensing lens 19 formed in a raised shape is provided at a back portion of the flow cell 10 at a position on the same extension.

The sample fluid is supplied to the first flow passage 13 through the inlet port 11, and is discharged to the outside through the outlet port 12 by way of the second flow passage 14 and the third flow passage 15. Moreover, the irradiation light La enters the flow cell 10 through an incident surface 16 forming a bottom surface of the flow cell 10, and exits to the outside through a transmission surface 17 forming an upper surface of the flow cell 10. The irradiation light La having exited to the outside of the flow cell is absorbed by a not-shown trap above the transmission surface 17.

Figure 4:
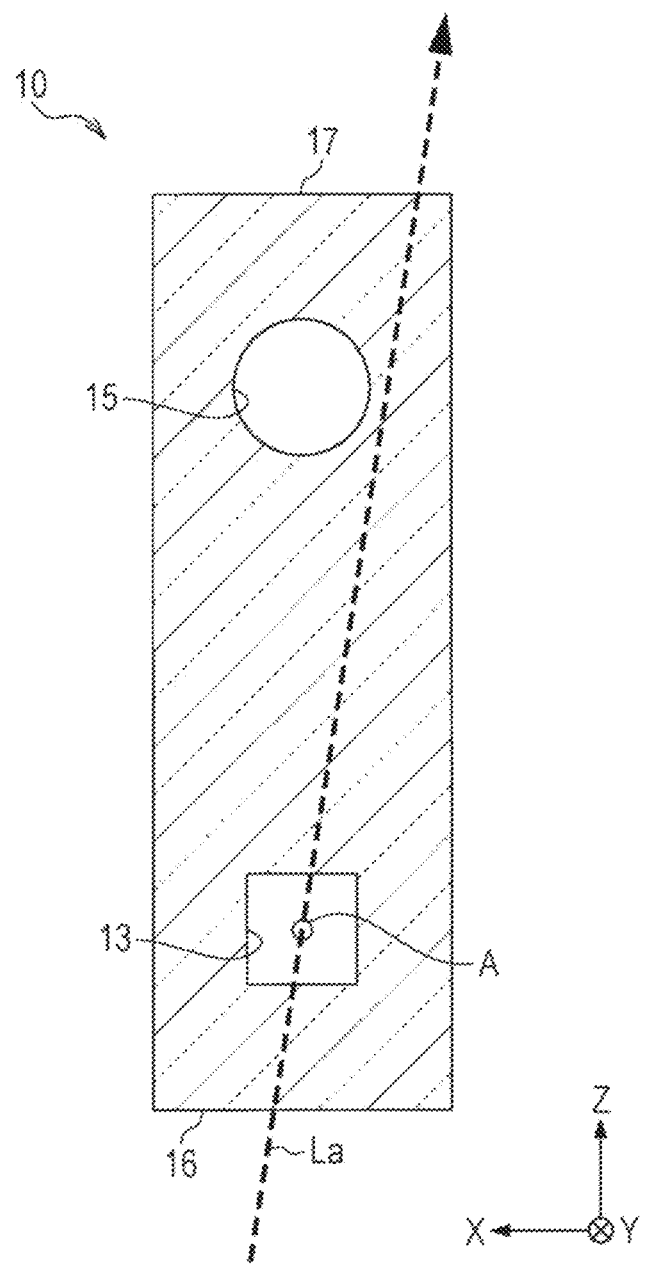
FIG. 4 is a vertical sectional view (a sectional view along an IV-IV cut line of FIG. 3) of the flow cell in one embodiment.

FIG. 4 is a vertical sectional view (a sectional view along an IV-IV cut line in FIG. 3) of the flow cell 10 in one embodiment from the front side.

The first flow passage 13 has a rectangular cross-section. At the first flow passage 13, in a section where the irradiation light La enters (is irradiated) (is condensed) the center (a predetermined position) of the first flow passage 13, a detection region A for the particle (a floating substance) contained in the sample fluid is formed.

The irradiation light La enters the flow cell 10 through the incident surface 16 in a state in which an angle of the irradiation light La is inclined with respect to the Z-direction as viewed from the front side. More specifically, the irradiation light La enters the flow cell 10 through the incident surface 16 at a predetermined angle with respect to the incident surface 16, the predetermined angle being such an angle that the irradiation light La passes through the detection region A while not interfering the third flow passage 15. Then, the irradiation light La enters the first flow passage 13, and passes (forms) the detection region A. Thereafter, the irradiation light La passes through a position deviating from the third flow passage 15, and exits to the outside through the transmission surface 17.

Here, the cross-section of the first flow passage 13 is in a rectangular shape for employing flat surfaces mirror-finished in nano order as the two wall surfaces defining the upper and lower of the first flow passage 13, through which the irradiation light La passes. With this configuration, noise (unnecessary light scattering and reflection) which may be caused at an interface between the wall surface of the first flow passage 13 and the sample fluid before and after passage of the irradiation light La through the detection region A formed inside the first flow passage 13 can be reduced as much as possible. Thus, in the first flow passage 13, at least a wall surface of a portion through which the irradiation light La passes may be formed as a flat surface. Moreover, in the present embodiment, the sectional shape of the third flow passage 15 is a circular shape. However, the sectional shape of the third flow passage 15 is not limited to above. The sectional area of each of the flow passages 13, 14, 15 can be set as necessary depending on the situation.

Figure 5:
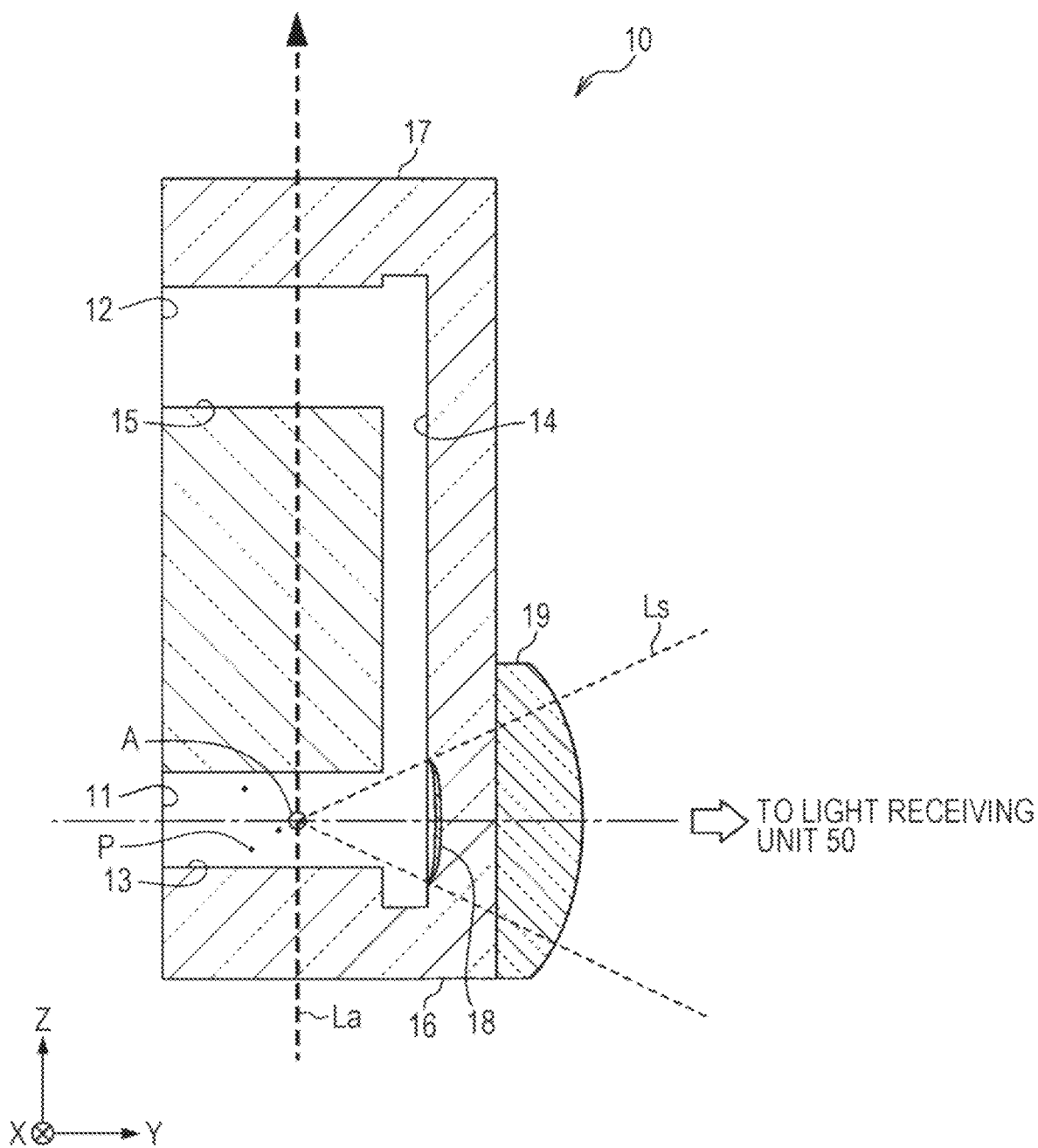
FIG. 5 is a vertical sectional view (a sectional view along a V-V cut line of FIG. 3) of the flow cell in one embodiment.

FIG. 5 is a vertical sectional view (a sectional view along a V-V cut line in FIG. 3) of the flow cell 10 in one embodiment from the front side.

The irradiation light La enters the flow cell 10 through the incident surface 16 in a state in which the irradiation light La is parallel to the Z-direction as viewed from the side face thereby forming the detection region A in the first flow passage 13. The center of the detection region A is present on the light receiving axis of the light receiving unit 50 positioned behind the flow cell. Moreover, the recessed portion 18 and the condensing lens 19 are arranged such that the center axes thereof are coincident with the light receiving axis of the light receiving unit 50. Here, the recessed portion 18 is used for reducing light refraction at an inner wall surface due to a difference between the refractive index of the sample fluid and the refractive index of the flow cell. With such arrangement, the condensing lens 19 and the multiple light receiving lenses included in the light receiving unit 50 positioned behind the condensing lens 19 can integrally demonstrate a good light condensing capability.

When a particle P contained in the sample fluid passes through the detection region A, the particle P generates side scattered light Ls as the scattered light due to interaction between the particle P and the irradiation light La. The side scattered light Ls is, through the recessed portion 18, condensed by the condensing lens 19 and the multiple light receiving lenses in the light receiving unit 50. Note that a dashed line in FIG. 5 indicates the area of scattering of the side scattered light Ls, and does not indicate the side scattered light Ls after condensing. Moreover, in order to utilize the condensing angle of the condensing lens 19 to a maximum extent, the position of an inner wall of the second flow passage 14 is set to such a position that entrance of light into the condensing lens 19 is not interfered.

The irradiation light La having passed through the first flow passage 13 passes through a position deviating not only from the second flow passage 14 but also from the third flow passage 15, and exits to the outside of the flow cell 10 through the transmission surface 17. Of three flow passages 13, 14, 15 formed inside the flow cell 10, the flow passage through which the irradiation light La passes is only the first flow passage 13 as described above. The irradiation light La does not substantially interfere the second flow passage 14 or the third flow passage 15. The optical path of the irradiation light La is set to such a position in order that occurrence of noise due to interference of the irradiation light La with the second flow passage 14 or the third flow passage 15 can be reduced. Thus, only proper scattered light generated from the nano-order (nm) fine particle contained in the sample fluid is easily detected. As a result, particle detection accuracy and particle counting accuracy can be improved.

[Internal Structure of Flow Cell Unit]

Figure 6:
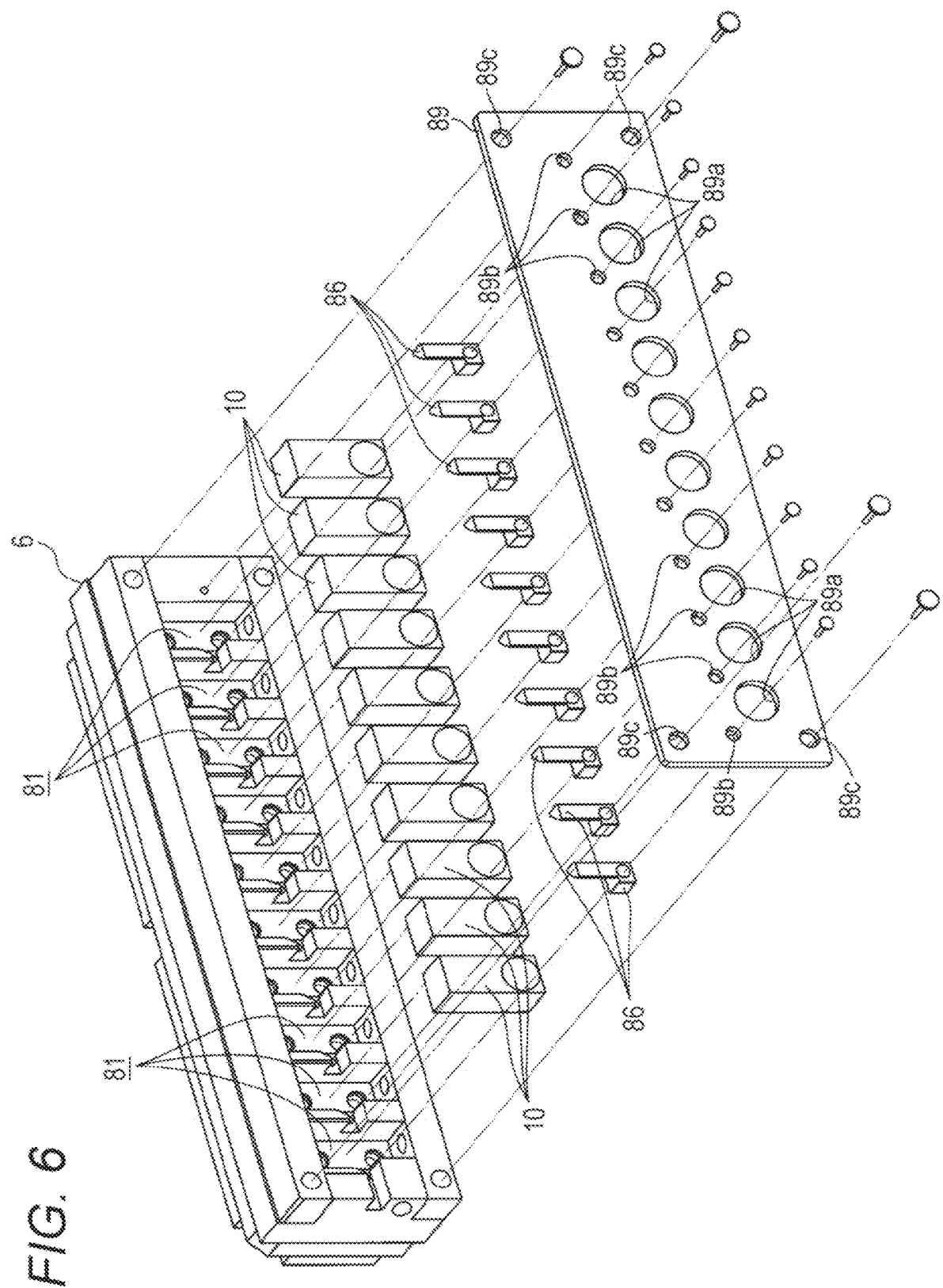
FIG. 6 is a disassembled perspective view of a flow cell unit in one embodiment.

FIG. 6 is an exploded perspective view of the flow cell unit 80 in one embodiment from the back side. The flow cell unit 80 is a multi-flow cell including the multiple flow cells 10 integrated by fixing to the inside of the flow cell holder 6. The flow cell unit 80 includes, for example, the flow cell holder 6, the flow cells 10, pressure bushes 86, and a backboard 89.

In the flow cell holder 6, housing chambers 81 corresponding to the number of flow cells 10 are formed (only some of these components are illustrated with reference numerals). The multiple flow cells 10 are pushed into inner walls of the housing chambers 81 by the pressure bushes 86 in a state in which the flow cells 10 are separately housed in these uniformly-divided housing chambers 81. Further, a back surface of the flow cell holder 6 in this state is covered with the backboard 89. For example, holes 89a and holes 89b, 89c for fastening are perforated at the backboard 89. The holes 89a are provided for avoiding interference between the condensing lens 19 provided on a back surface of each flow cell 10 and the backboard 89 (avoiding such interfere to expose the condensing lens 19). The backboard 89 is fastened to the flow cell holder 6 with a fastening member such as a screw.

Note that a not-shown opening is perforated at a position corresponding to above each housing chamber 81 at an upper portion of the flow cell holder 6. Such an opening is used to release the irradiation light having transmitted through each flow cell 10. Moreover, the not-shown trap configured to absorb the released irradiation light is provided above the opening. The trap may be provided across the entirety of the upper portion of the flow cell holder 6, or may be provided at the upper portion of one flow cell 10. In the latter case, the trap may be according to a change in the channel targeted for detection, moved in the X-direction together with the optical axis of a light receiving system so that the trap is provided at the upper portion of the flow cell 10 of the channel targeted for counting.

Subsequently, the shape and role of the pressure bush 86 will be described with reference to FIGS. 7A and 7B.

Figure 7A:
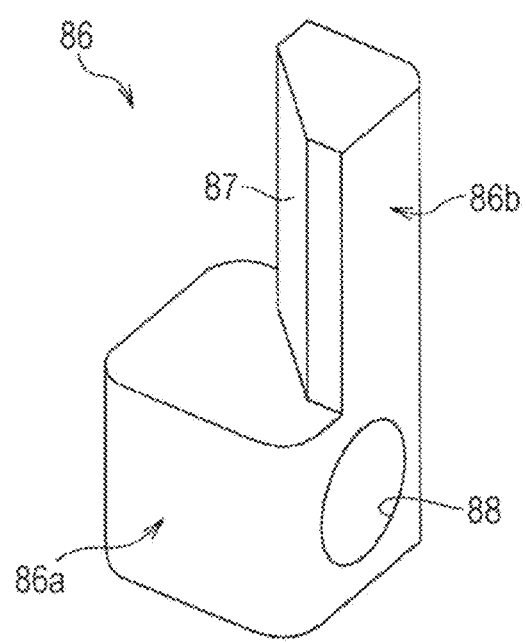
FIGS. 7A and 7B are perspective views of a pressure bush in one embodiment.

FIG. 7A is a perspective view of the pressure bush 86 of one embodiment. The pressure bush 86 includes a lower portion 86a formed in a substantially rectangular columnar shape and an upper portion 86b. The upper portion 86b is continuously formed on an extension of one corner forming the lower portion 86a, and has a substantially triangular columnar shape. Of these portions, the upper portion 86b has an edge on the extension of the corner of the lower portion 86a, and has an opposing surface 87 at a position facing such an edge. Moreover, a fastening hole 88 is perforated to penetrate the lower portion 86a in the front-back direction. The fastening hole 88 is provided for insertion of a fastening member configured to fasten the entirety of the pressure bush 86 to the flow cell holder 6. Note that the material of the pressure bush 86 is a material having elasticity, such as resin (e.g., Teflon (the registered trademark)).

Figure 7B:
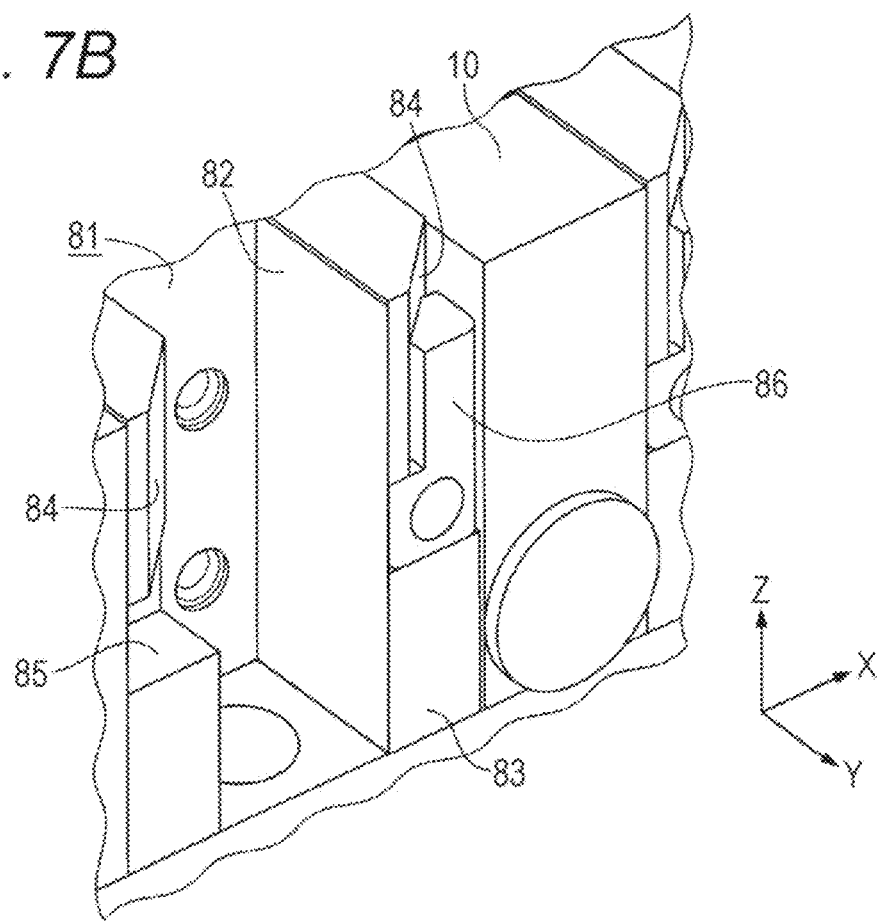

FIG. 7B is a partially-enlarged perspective view of the flow cell holder 6. FIG. 7B illustrates a state in which the flow cells 10 and the pressure bushes 86 are housed in the flow cell holder 6. Here, for the sake of easy understanding of the present embodiment, an upper frame (a portion forming an upper wall of each housing chamber 81) of the flow cell holder 6 is not shown.

In addition to the housing chambers 81, mounting tables 85 for mounting the pressure bushes 86 are formed inside the flow cell holder 6. The width (the dimension in the X-direction) of the housing chamber 81 is set slightly wider than the width of the flow cell 10 to smoothly take in or out the flow cell 10. Moreover, an opposing wall 84 is formed above the mounting table 85. The opposing wall 84 is set as an outward angle with respect to such an inner wall. The pressure bush 86 is mounted on the mounting table 85 in a state in which the opposing surface 87 closely contacts the opposing wall 84.

In the flow cell 10 housed in the housing chamber 81, the entirety of one side surface of the flow cell 10 faces a first reference surface 82. On the other hand, the other side surface of the flow cell 10 partially faces a side surface of the pressure bush 86. The pressure bush 86 mounted on the mounting table 85 presses the flow cell 10 in the X-direction from the other side surface, and causes the flow cell 10 to closely contact the first reference surface 82. Here, the first reference surface 82 is a reference surface in determination on the position of each flow cell 10 in the X-direction in the flow cell holder 6. The pressure bush 86 presses the flow cell 10 and causes the flow cell 10 to closely contact the first reference surface 82, and in this manner, the flow cell 10 is fixed to a predetermined accurate position in the X-direction. Note that the position of each flow cell 10 in the Y-direction in the flow cell holder 6 is determined with reference to a second reference surface 83 forming part of the back surface of the flow cell holder 6.

Figure 8C:
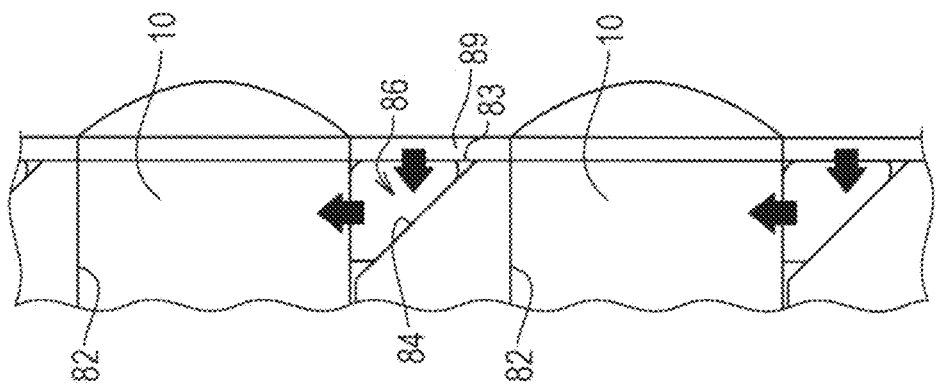
FIGS. 8A, 8B, and 8C are views for describing the form of fixing of each flow cell in a stepwise manner.
Figure 8B:
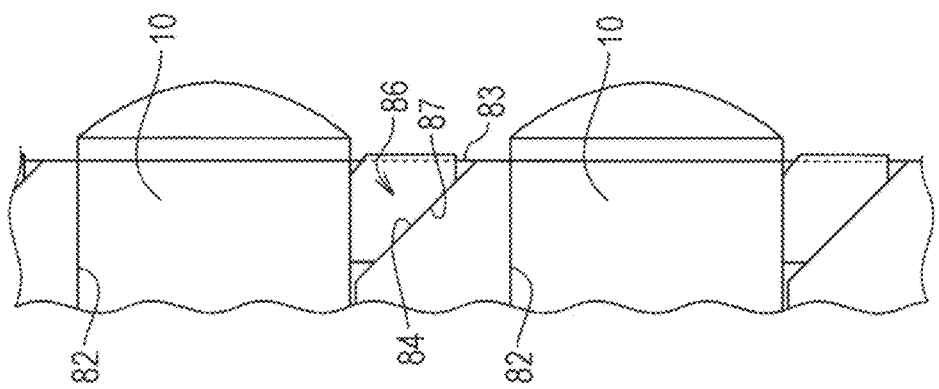
Figure 8A:
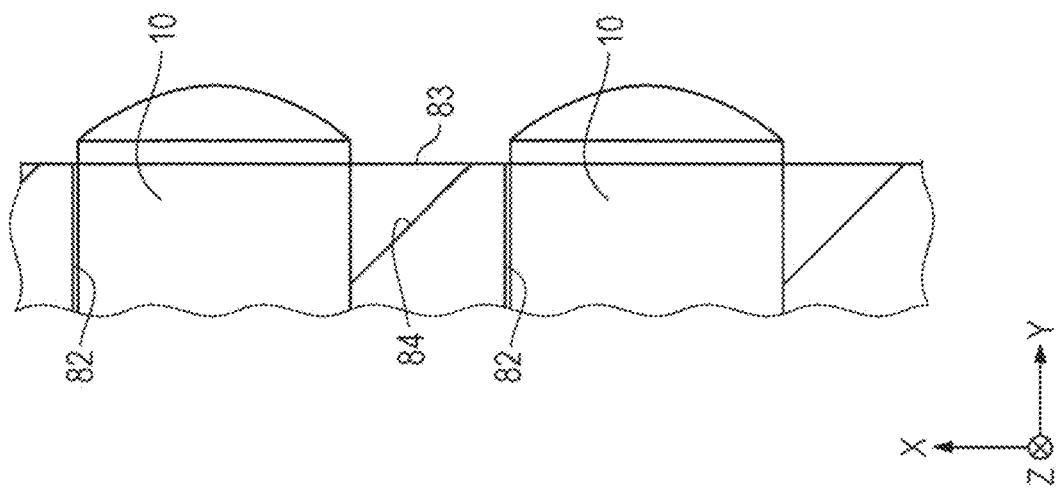

FIGS. 8A, 8B, and 8C are views for describing the form of fixing of each flow cell 10 to the flow cell holder 6 with reference to the stages of assembly of the flow cell unit 80. In FIGS. 8A, 8B, and 8C, the upper frame (the portion forming the upper wall of each housing chamber 81) of the flow cell holder 6 is not shown either.

FIG. 8A illustrates the stage of housing the flow cells 10 in the housing chambers 81. At this stage, no action has done to make the flow cell 10 to closely contact the first reference surface 82, and therefore, there are possibilities that a slight clearance is present between the flow cell 10 and the first reference surface 82 (such a clearance is not present in some cases).

FIG. 8B illustrates the stage of mounting the pressure bushes 86 on the mounting tables 85. At this stage, in association with close contact of the opposing surface 87 of the pressure bush 86 with the opposing wall 84, the flow cell 10 is pressed in the X-direction by the pressure bush 86 to closely contact the first reference surface 82. Thus, the clearance between the flow cell 10 and the first reference surface 82 is eliminated. In this state, the pressure bush 86 slightly projects to the back side with respect to the position of the second reference surface 83. Such projection functions as a push-in margin for the backboard 89 to be fastened thereafter.

FIG. 8C illustrates the stage of fastening the backboard 89 to the flow cell holder 6. At this stage, the pressure bushes 86 slightly projecting to the back side at the stage of FIG. 8B are pushed in the Y-direction by the backboard 89, and closely contact the second reference surfaces 83. In this state, the pressure bush 86 is pressed against the opposing wall 84, and is pushed back by the opposing wall 84. This generates, at the pressure bush 86, the force of pushing the flow cell 10 in the X-direction. Accordingly, the flow cell 10 can more firmly closely contact the first reference surface 82.

Note that on the front side, the pipes 8 (see FIG. 9B) not shown in FIGS. 8A to 8C are connected to the flow cell 10 through joints. Such a joint has a structure for preventing leakage of the sample fluid. This joint is pushed in the Y-direction when the flow cell 10 is in a state in which the flow cell 10 is housed in the flow cell holder 6. In this state, the flow cell 10 is pushed in the Y-direction, and the back surface thereof closely contacts the backboard 89. Further, the position of the flow cell 10 in the Y-direction is adjusted to the second reference surface 83. Thus, in the Y-direction, the flow cell 10 is also fixed to a predetermined accurate position.

With the above-described structure, positioning regarding the position of each flow cell 10 in the X-direction and the Y-direction in the flow cell holder 6 (the flow cell unit 80) can be accurately performed. Thus, each flow cell 10 can be firmly fixed to a desired position.

Figure 9A:
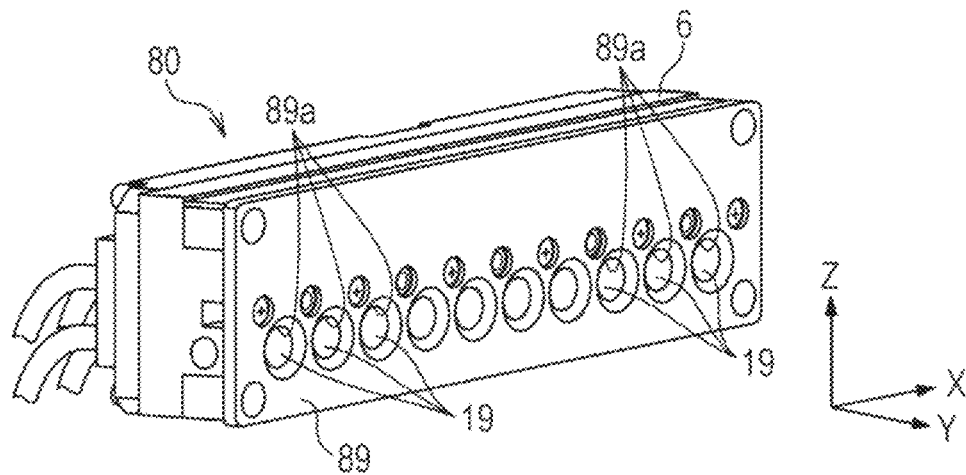
FIGS. 9A and 9B are perspective views of the flow cell unit in one embodiment.
Figure 9B:
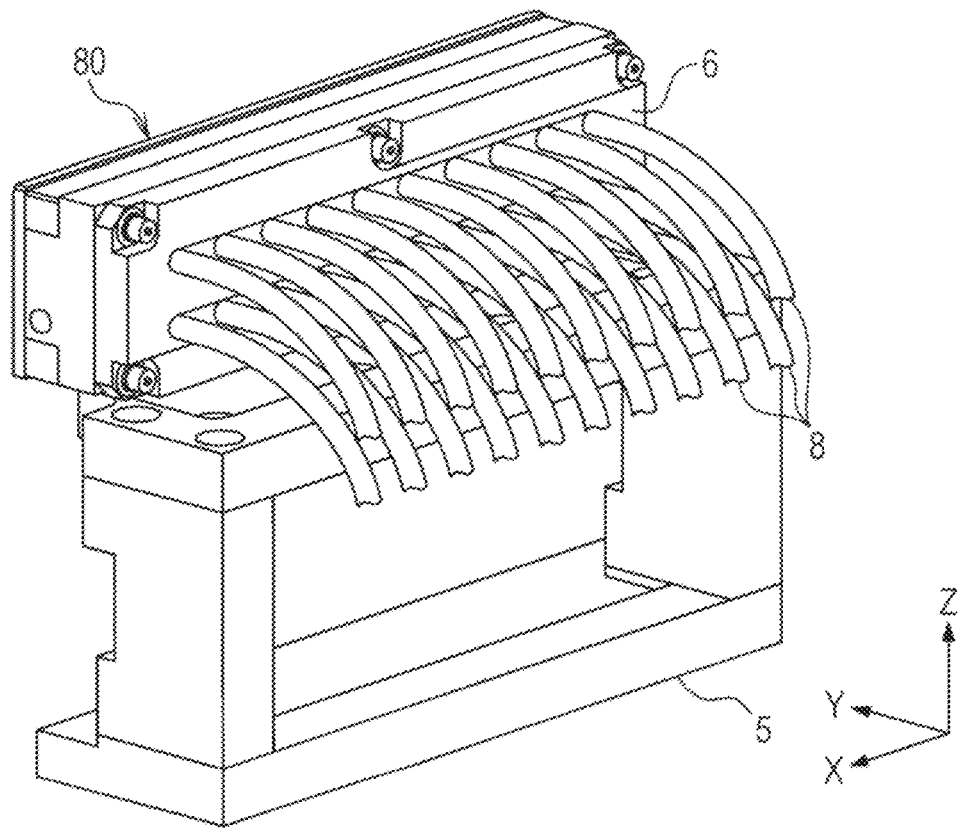

FIGS. 9A and 9B are perspective views of the flow cell unit 80. Of these figures, FIG. 9A is the perspective view of the flow cell unit 80 as a single body from the back side. FIG. 9B is the perspective view of the flow cell unit 80 set to the flow cell base 5 from the front side.

On the back side of the flow cell unit 80, the condensing lenses 19 provided on the back surfaces of the flow cells 10 housed inside are visible through the holes 89a perforated at the backboard 89 fastened to the flow cell holder 6. Moreover, on the front side of the flow cell unit 80, the pipes 8 connected to the flow cells 10 housed inside through the joints extend in the state of being aligned in two upper and lower lines. The pipe 8 is a tube having plasticity and made of, e.g., PFA resin. The pipes 8 are come out of the housing 4 through the pipe window provided at the front of the housing 4 without substantially interfering other components of the particle counter 1. Moreover, on the outside of the housing 4, the pipes 8 aligned in the lower line are connected to a delivery port as a sample fluid supply source, and the pipes 8 aligned in the upper line are connected to a discharge port as a sample fluid discharge destination.

In the flow cell 10 of the present embodiment, the vertical flow passage is formed to have the substantially C-shape as described above. Further, the sample fluid inlet ports are aligned in lower line and outlet ports are aligned in upper line, on the front side. Thus, two pipes 8 connected to each flow cell 10 are all aligned on the front side of the flow cell unit 80. Moreover, the flow cell unit 80 is fixed to the sensor base 2 through the flow cell base 5. Thus, even when the channel targeted for counting is changed, the pipes 8 do not move. Unless some kinds of external factors are provided, the pipes 8 stay at substantially-constant positions. Thus, less failure regarding the pipe 8, such as looseness or cracking due to movement or warpage of the pipe 8, is caused, and therefore, there is no concern about leakage of the sample fluid.

Here, for comparison with the present embodiment, a case where multiple flow cells configured such that flow passages have a substantially straight shape or a substantially L-shape are arrayed will be considered. At such a flow cell, sample fluid inlet and outlet ports are provided at two different surfaces. Thus, pipe spaces are needed at each position facing these two surfaces. For this reason, the entirety of a device is upsized consequently. Moreover, there are, depending on the direction of pipe extension, possibilities that a pipe interferes irradiation light exiting from the flow cell, or there are possibilities that the pipe moves or warps due to contact of the extending pipe with other components and a fine particle is caused from, e.g., an inner wall of the pipe. This leads to occurrence of optical or electrical noise. Such noise degrades particle detection accuracy.

On the other hand, in the present embodiment, all pipes 8 are aligned on the front side. Thus, a space ensured for the pipes is only at one surface (the front side). Consequently, the entirety of the device can be compactified. Moreover, the irradiation light La enters the flow cell 10 through the bottom surface (the incident surface 16), and exits from the flow cell 10 through the upper surface (the transmission surface 17). Thus, the pipes 8 do not substantially interfere the irradiation light La. Further, all pipes 8 aligned on the front side of the flow cell unit 80 directly extend to the front side, and come out of the housing 4. Thus, the pipes 8 do not substantially interfere other components of the particle counter 1. Consequently, in the present embodiment, occurrence of noise due to the pipes 8 can be reduced. As a result, the particle can be detected with favorable accuracy.

[Functions of Particle Counter]

Figure 10:
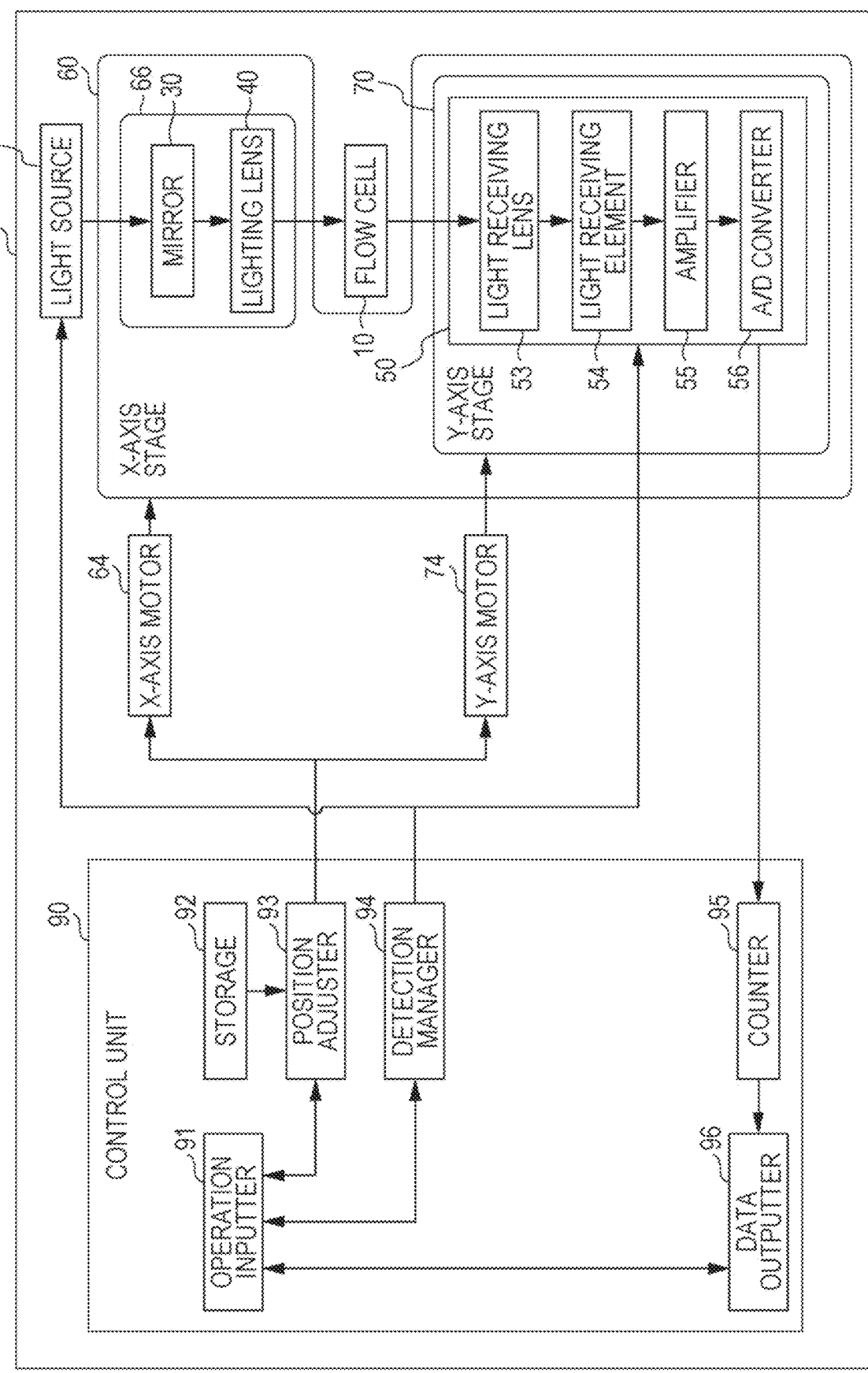
FIG. 10 is a functional block diagram of a configuration of the particle counter in one embodiment.

FIG. 10 is a functional block diagram of a configuration of the particle counter 1 in one embodiment.

In addition to each of the above-described components used for particle detection, the particle counter 1 includes the control unit 90 configured to control particle detection and particle counting. The control unit 90 includes, for example, an operation inputter 91, a storage 92, a position adjuster 93, a detection manager 94, a counter 95, and a data outputter 96.

The operation inputter 91 provides an operation screen to the user, and receives operation made by the user via the operation screen. On the operation screen, the user can make operation for instructing, e.g., selection of the channel targeted for counting, start and completion of detection, and saving of a counting result. The operation inputter 91 outputs an instruction corresponding to the contents of the received operation to the position adjuster 93, the detection manager 94, and the data outputter 96 as other functions. Further, the operation inputter 91 performs, e.g., switching of the operation screen according to the contents of input from the position adjuster 93, the detection manager 94, and the data outputter 96 as other functions.

The storage 92 is a so-called storage area, and stores information regarding particle detection and particle counting. The storage 92 stores the X-coordinates and the Y-coordinates corresponding to the flow cell 10 of each channel in advance.

That is, the storage 92, regarding the multiple flow passages 13 to 15 (the flow cell 10) formed inside the flow cell unit 80, stores, in advance, at least the X-direction position of each optical axis moved corresponding to the position of each flow cell 10 by the X-axis actuator 62. These optical axes include the optical axis of the irradiation light La entering the flow passage and the optical axis of the emitted light (the scattered light) received by the light receiving unit 50.

Further, in addition to the above-described position of each optical axis, the storage 92 stores, in advance, the Y-direction focal point position of the light receiving lens 53 adjusted corresponding to the position of each flow cell 10 by the Y-axis actuator 72, the light receiving lens 53 being included in the light receiving unit 50.

When a specific channel is specified by the operation inputter 91, the position adjuster 93 first reads, from the storage 92, the X-coordinates and the Y-coordinates corresponding to the flow cell 10 of such a channel. Then, the position adjuster 93 actuates the X-axis actuator 62 to drive the X-axis motor 64, thereby sliding the X-axis stage 60 to the X-coordinates.

Further, the position adjuster 93 actuates the Y-axis actuator 72 to drive the Y-axis motor 74, thereby sliding the Y-axis stage 70 to the Y-coordinates. When drive of the X-axis motor 64 and the Y-axis motor 74 is ended, i.e., when adjustment of the positions of the X-axis stage 60 and the Y-axis stage 70 is completed, a state in which detection can be started is brought. The position adjuster 93 notifies the operation inputter 91 of the state in which detection can be started.

When the operation inputter 91 makes the instruction of starting detection for the specific channel, the detection manager 94 switches the light source 20 and the light receiving unit 50 to an actuation state. Moreover, when the operation inputter 91 makes the instruction of completing detection for the specific channel, the detection manager 94 switches the light source 20 and the light receiving unit 50 to a non-actuation state. When the light source 20 and the light receiving unit 50 are switched to the non-actuation state, a state in which the channel targeted for counting can be changed is brought. The detection manager 94 notifies the operation inputter 91 of the state in which the channel can be changed.

Note that switching of the actuation state of the light source 20 may be performed every time detection is started and completed. Alternatively, while the particle counter 1 is operated, the light source 20 may be maintained in the actuation state. Alternatively, the particle counter 1 may be configured such that detection is started or completed without the operation inputter 91 (the operation by the user). For example, detection may be automatically started, taking completion of position adjustment of the stages 60, 70 by the position adjuster 93 as a trigger. Then, detection may be automatically completed after a lapse of predetermined time after the start of detection.

When the light source 20 and the light receiving unit 50 are actuated by the detection manager 94, the irradiation light La emitted from the light source 20 is reflected on the mirror 30. Thereafter, the irradiation light La passes through the lighting lens 40, and enters the flow cell 10 in a concentrated state. Accordingly, the irradiation light La forms the detection region A in the sample fluid flow passage. When the particle P contained in the sample fluid passes through the detection region A, the particle P generates the side scattered light Ls as the scattered light. The side scattered light Ls is condensed by the light receiving lens 53, enters the light receiving element 54, and is received by the light receiving element 54. The side scattered light Ls received by the light receiving element 54 is converted into the electrical signal corresponding to the intensity of the side scattered light Ls. Such an electrical signal is amplified with a predetermined gain by the amplifier 55, and thereafter, is converted into a digital signal by the A/D converter 56. Then, the light receiving unit 50 outputs the obtained digital signal to the counter 95.

The counter 95 determines the particle size of the detected particle based on the level of the digital signal output from the light receiving unit 50, i.e., the intensity of the side scattered light Ls, thereby counting the particle for each particle size. The counter 95 outputs a counting result to the data outputter 96.

The data outputter 96 outputs data based on the counting result output from the counter 95. The form of the output of the data may be displaying on a display screen, output to a printer, or transmission to other devices via a network. When final data of the counting result is ready upon completion of detection, a state in which the final data can be saved is brought. The data outputter 96 notifies the operation inputter 91 of the state in which the final data can be saved.

Note that the control unit 90 may be integrally provided inside the particle counter 1. Alternatively, the control unit 90 may be provided as a separate body outside the particle counter 1. In the latter case, the control unit 90 may be connected to the particle counter 1 via, e.g., a cable or a network.

[Configuration of Particle Counter in Other Embodiments]

Figure 11:
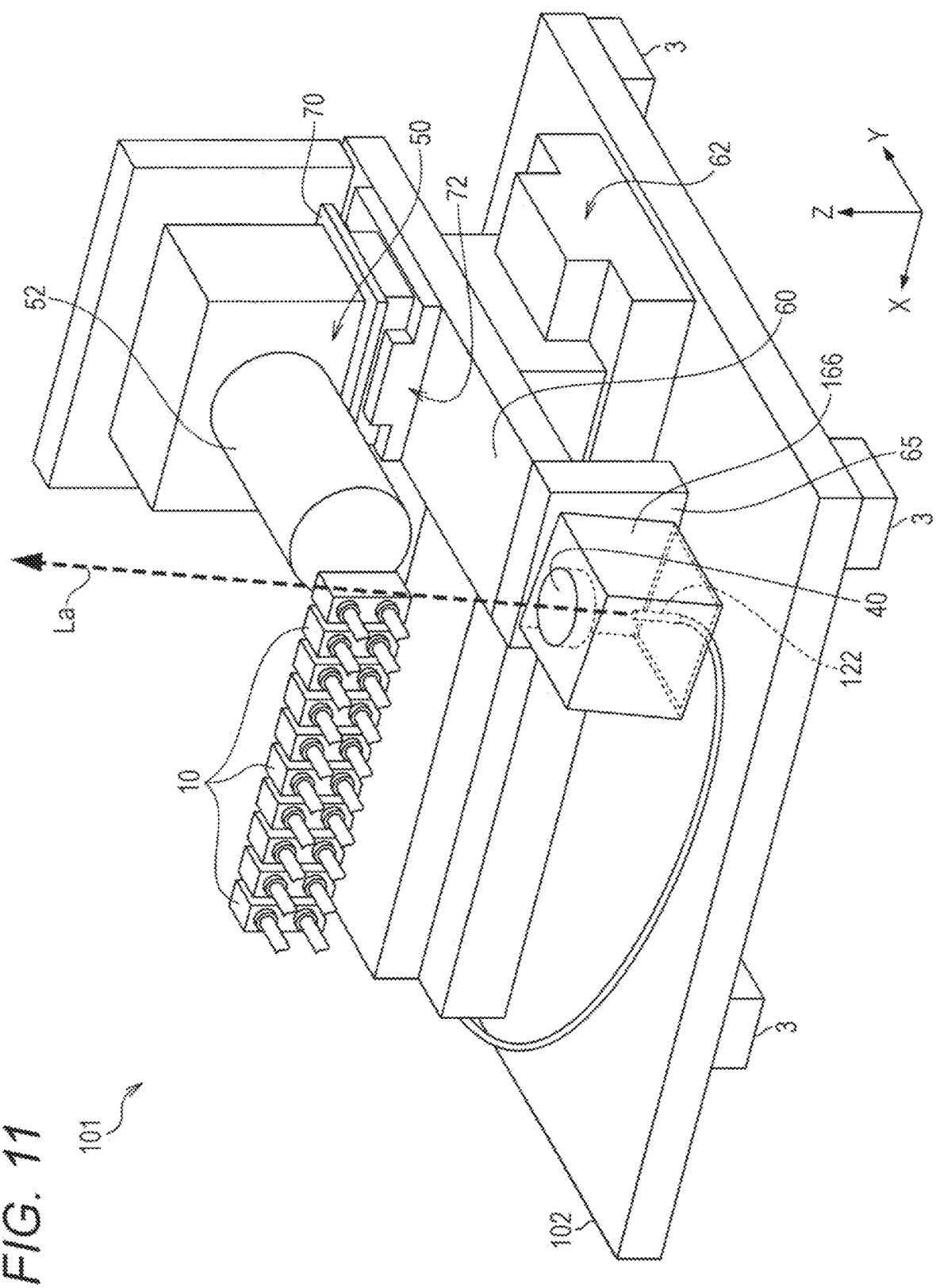
FIG. 11 is a schematic perspective view of a particle counter in another embodiment.

FIG. 11 is a schematic perspective view of a particle counter 101 in another embodiment. For the sake of easy understanding of the disclosure, some components are not shown in FIG. 11.

In the particle counter 101, a fiber laser is used as the light source of the irradiation light La. The light source 120 is arranged outside the housing 4 (not shown). A head 122 is provided at a tip end of an optical fiber extending from the light source 120. The head 122 is fixed to a holder 166. Thus, according to the selected channel, the head 122 moves in the X-direction in tandem with the X-axis stage 60. The irradiation light La is emitted from the head 122 to the flow passage of the flow cell 10. Unlike the above-described embodiment, the irradiation light La emitted from the light source does not need to be reflected toward the flow passage of the flow cell 10. Thus, in the present embodiment, no mirror is provided. Moreover, in the case of using the fiber laser, the light source can be arranged outside the housing 4. Thus, measures for heat release are not substantially necessary. With use of such a light source, the particle counter 101 can be further downsized.

[Superiority of Embodiments Above]

As described above, according to the above-described embodiments, the following advantageous effects are obtained.

(1) The flow cell unit 80 is fixed to the sensor base 2 through the flow cell base 5. Even in a case where the channel targeted for counting is changed and the irradiation optical system and the light receiving optical system are moved, the flow cells 10 do not move. Thus, less failure such as looseness or cracking is caused at the pipes 8 connected to the flow cells 10. Consequently, according to the above-described embodiments, leakage of the sample fluid can be prevented.

(2) The flow passage of the flow cell 10 is formed in the substantially C-shape. Thus, all pipes 8 connected to the multiple flow cells 10 are aligned at one surface. With this configuration, the space ensured for arranging the pipes 8 is only at one surface. Consequently, according to the above-described embodiments, the particle counter 1 can be downsized.

(3) The user of the particle counter 1 merely selects the channel targeted for counting in order that the mirror 30, the lighting lens 40, and the light receiving unit 50 can be moved to optimal positions corresponding to such a channel. Thus, according to the selected channel, the position of the optical axis of the irradiation optical system and the positions of the optical axis and focal point of the light receiving optical system can be adjusted with high accuracy.

(4) The flow cell unit 80 has such an internal structure that positioning of the housed flow cell 10 in the X-direction and the Y-direction can be accurately performed. Thus, each flow cell 10 can be firmly fixed to an accurate position.

(5) The irradiation light La enters the flow cell 10 at such an angle that the irradiation light La passes through the first flow passage 13 and does not interfere the second flow passage 14 or the third flow passage 15. Thus, occurrence of noise can be reduced. As a result, detection of the scattered light generated from the particle is facilitated.

Any of the above-described advantageous effects (3) to (5) contributes to high-accuracy detection of the nano-order fine particle contained in the sample fluid. Thus, according to the above-described embodiments, the accuracy of particle detection and particle counting can be improved.

The aspects of the present disclosure are not limited to the above-described embodiments, and various modifications can be made to these aspects.

In the flow cell unit 80 in the above-described embodiments, the multiple flow cells 10 are arrayed in one direction, and the single substantially C-shaped flow passage is formed inside each flow cell 10. Instead of the flow cell unit 80, an integrated flow cell (a single flow cell configured such that multiple substantially C-shaped flow passages are formed inside) including the multiple substantially C-shaped flow passages arrayed in one direction may be used as the multi-flow cell.

In the above-described embodiments, the light receiving unit 50 is provided movable in the X-direction and the Y-direction in association with slide of the X-axis stage 60 and the Y-axis stage 70. Instead, a mirror movable in the X-direction and the Y-direction in association with slide of the X-axis stage 60 and the Y-axis stage 70 may be separately provided behind the flow cell unit 80. In this case, the light receiving unit 50 does not need to be moved. For example, the X-axis stage 60 does not necessarily support the light receiving unit 50. Alternatively, the light generated from the particle contained in the sample fluid may enter the light receiving unit 50 through the mirror. In such a configuration, the separately-provided mirror is moved in the X-direction and the Y-direction according to the channel targeted for counting. With this configuration, the focal point of the light, entering the light receiving unit 50, from the particle through the mirror can be adjusted along the optical axis with high accuracy.

In the above-described embodiments, the photodiode is used as the light receiving element 54. Instead, a multi-divided light receiving element may be used as the light receiving element 54. With use of the multi-divided light receiving element, a SN ratio can be further improved. As a result, particle detection and particle counting can be performed with higher accuracy.

In the above-described embodiments, the pipes 8 connected to the flow cells 10 has such a sufficient length that the pipes 8 extend to the outside of the housing 4. The pipes 8 are, at a tip end portion extending outward of the pipe window provided at the housing 4, connected to the sample fluid inlet and outlet ports. However, the form of connection of the pipes 8 is not limited to above. For example, the pipes 8 may be fixed to the pipe window, and at such a portion, may be connected to the sample fluid inlet and outlet ports.

In the above-described embodiments, the actuation state of the light source 20 is switched by the control unit 90 (the detection manager 94). Instead, a shutter which can close an emission port of the light source 20 to block the irradiation light may be separately provided. In this case, opening/closing (the presence/absence of light shielding) of the shutter may be switched by the control unit 90.

In addition, the materials, the numerical values, and the like described as examples of each component of the particle counter 1 are merely examples. Needless to say, these examples can be modified as necessary upon implementation of the technique of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A particle counter comprising:
   a light source configured to emit irradiation light;
   an irradiation optical system configured to irradiate a predetermined position on an optical axis of the irradiation light with the irradiation light;
   a multi-flow cell comprising transparent bodies at fixed positions on a main body and including flow passages arrayed in a first direction, the flow passage having a detection region for detecting a particle contained in a sample fluid flowing in the flow passage, the detection region being formed at the predetermined position on the optical axis of the irradiation light in the flow passage when the predetermined position is irradiated with the irradiation light from outside;
   a light receiving optical system configured to receive emitted light generated from the particle passing through the detection region, a light receiving axis of the light receiving optical system extending in a second direction perpendicular to the first direction;
   an optical axis moving unit configured to move, in the first direction along the array of the multiple flow passages, the optical axis of the irradiation light entering the at least one flow passage and the light receiving axis of the light receiving optical system; and
   a counter configured to count the particle for each particle size based on an intensity of the emitted light received by the light receiving optical system, wherein
   each flow cell of the multi-flow cell includes a flow passage formed as one passage and having a first flow passage extending in the second direction from an inlet port into which the sample fluid is supplied, a third flow passage extending in the second direction from an outlet port from which the sample fluid is discharged, and a second flow passage extending in a third direction perpendicular to both of the first and second directions and connected to the first and third flow passages,
   each flow cell further includes an incident surface below the first flow passage in the third direction, and
   the irradiation light enters one of the multiple flow cells through the incident surface.

2. The particle counter according to claim 1, further comprising a focal point adjustment unit configured to adjust a focal point of the light receiving optical system in the second direction.

3. The particle counter according to claim 2, wherein
the focal point adjustment unit includes a first actuator configured to move a first stage configured to support the light receiving optical system in the second direction to adjust the focal point in the second direction, and
the optical axis moving unit includes a second actuator configured to move a second stage configured to support the first actuator together with the irradiation optical system in the first direction to move the optical axis of the irradiation light and the light receiving axis of the light receiving optical system in the first direction.

4. The particle counter according to claim 2, further comprising a storage configured to store, regarding the multiple flow passages formed inside the multi-flow cell, at least a position of each of the optical axis of the irradiation light and the light receiving axis of the light receiving optical system in the first direction in advance, the optical axis of the irradiation light and the light receiving axis of the light receiving optical system being moved corresponding to a position of each flow passage by the optical axis moving unit, wherein
the optical axis moving unit is configured to move, corresponding to the at least one flow passage in which the detection region is formed, the optical axis of the irradiation light and the light receiving axis of the light receiving optical system to the position of each of the optical axis of the irradiation light and the light receiving axis of the light receiving optical system stored in advance in the storage,
the storage further stores a position of the focal point in the second direction, the focal point being adjusted corresponding to the position of each flow passage by the focal point adjustment unit, and
the focal point adjustment unit is configured to adjust, corresponding to the at least one flow passage in which the detection region is formed, the focal point to the position of the focal point stored in the storage.

5. The particle counter according to claim 1, further comprising a storage configured to store, regarding the multiple flow passages formed inside the multi-flow cell, at least a position of each of the optical axis of the irradiation light and the light receiving axis of the light receiving optical system in the first direction in advance, the optical axis of the irradiation light and the light receiving axis of the light receiving optical system being moved corresponding to a position of each flow passage by the optical axis moving unit, wherein
the optical axis moving unit is configured to move, corresponding to the at least one flow passage in which the detection region is formed, the optical axis of the irradiation light and the light receiving axis of the light receiving optical system to the position of each of the optical axis of the irradiation light and the light receiving axis of the light receiving optical system stored in advance in the storage.

6. The particle counter according to claim 1, wherein
the multi-flow cell is configured such that multiple flow cells of the transparent bodies having the flow passages are arrayed, and
each flow cell is fixed in close contact with a portion as a reference of a position of an entirety of the multi-flow cell in the first and second directions.

7. The particle counter according to claim 6, wherein each flow cell is in a substantially rectangular solid shape, and at an identical side surface, includes the inlet port into which the sample fluid is supplied and the outlet port from which the sample fluid is discharged.

8. The particle counter according to claim 1, wherein the emitted light is scattered light or fluorescence.

9. The particle counter according to claim 1, wherein the detection region is formed in the first flow passage.

10. The particle counter according to claim 1, wherein the irradiation light enters one of the multiple flow cells through the incident surface at a predetermined angle with respect to the incident surface, the predetermined angle being such an angle that the irradiation light passes through the detection region while not interfering the third flow passage.

* * * * *